Oct. 7, 1941.　　A. L. LEE ET AL　　2,258,328
DRIVING WHEEL
Filed Jan. 4, 1940　　3 Sheets-Sheet 1

Oct. 7, 1941.  A. L. LEE ET AL  2,258,328
DRIVING WHEEL
Filed Jan. 4, 1940  3 Sheets-Sheet 2

Inventors
Arthur L. Lee, and
James H. Fletcher
by Christy and Wharton
attorneys

Oct. 7, 1941.    A. L. LEE ET AL    2,258,328
DRIVING WHEEL
Filed Jan. 4, 1940    3 Sheets-Sheet 3

INVENTORS
Arthur L. Lee, and
James H. Fletcher
By Christy and Wharton
attorneys

Patented Oct. 7, 1941

2,258,328

UNITED STATES PATENT OFFICE 2,258,328

DRIVING WHEEL

Arthur L. Lee, Oakmont, Pa., and James H. Fletcher, Wilmette, Ill., assignors, by mesne assignments, to Lee-Norse Company, a corporation of Pennsylvania Application January 4, 1940, Serial No. 312,430

13 Claims. (Cl. 180—42)

This invention relates to a self-powered wheel primarily purposed for mine trucks.

Trucks used in mines for conveying coal, ore, or the like, are subjected in service to particularly exacting conditions. Mine trucks are limited in the space which they may occupy not only horizontally, but also vertically; they must have a very short truning radius; they should be organized, in spite of the stringent space limitations to which they are subjected, to carry a bulky load. As the material which they carry is heavy, they should be highly powered, and also they must be able to run on a rough and uneven surface, and frequently must surmount substantial grades. They should be able quickly to start a heavily loaded vehicle to which they are applied, and should be able to do so without spinning or waste of power.

Objects of our invention are to provide a self-powered wheel, a plurality of which when applied to a mine truck, or like vehicle, deliver relatively high driving power for propelling the truck; which wheel is so organized that it is compact in its horizontal dimensions, and is of sturdy and well-balanced construction.

Other objects of our invention are to provide a self-powered wheel for mine trucks which is organized and mounted so to turn in steering, that when the wheel is turned to a maximum inclination with the body of the truck, it occupies but very little more space than it occupies in its straight running position; and in which the spindle mounting of the wheel is so accommodated to the general wheel structure that it turns in an approximately pivotal manner in steering the truck during its progress.

Another object of our invention is to provide a wheel in which the load sustension of the wheel in application to a truck, and power-delivering connections of the wheel are symmetrical and approximately coincident with each other.

More generally, it is the object of our invention to provide a self-powered wheel so organized that when associated in appropriate number with a mine truck it is of material assistance in conforming the truck to the exigencies and requirements of its service.

Figure 1:
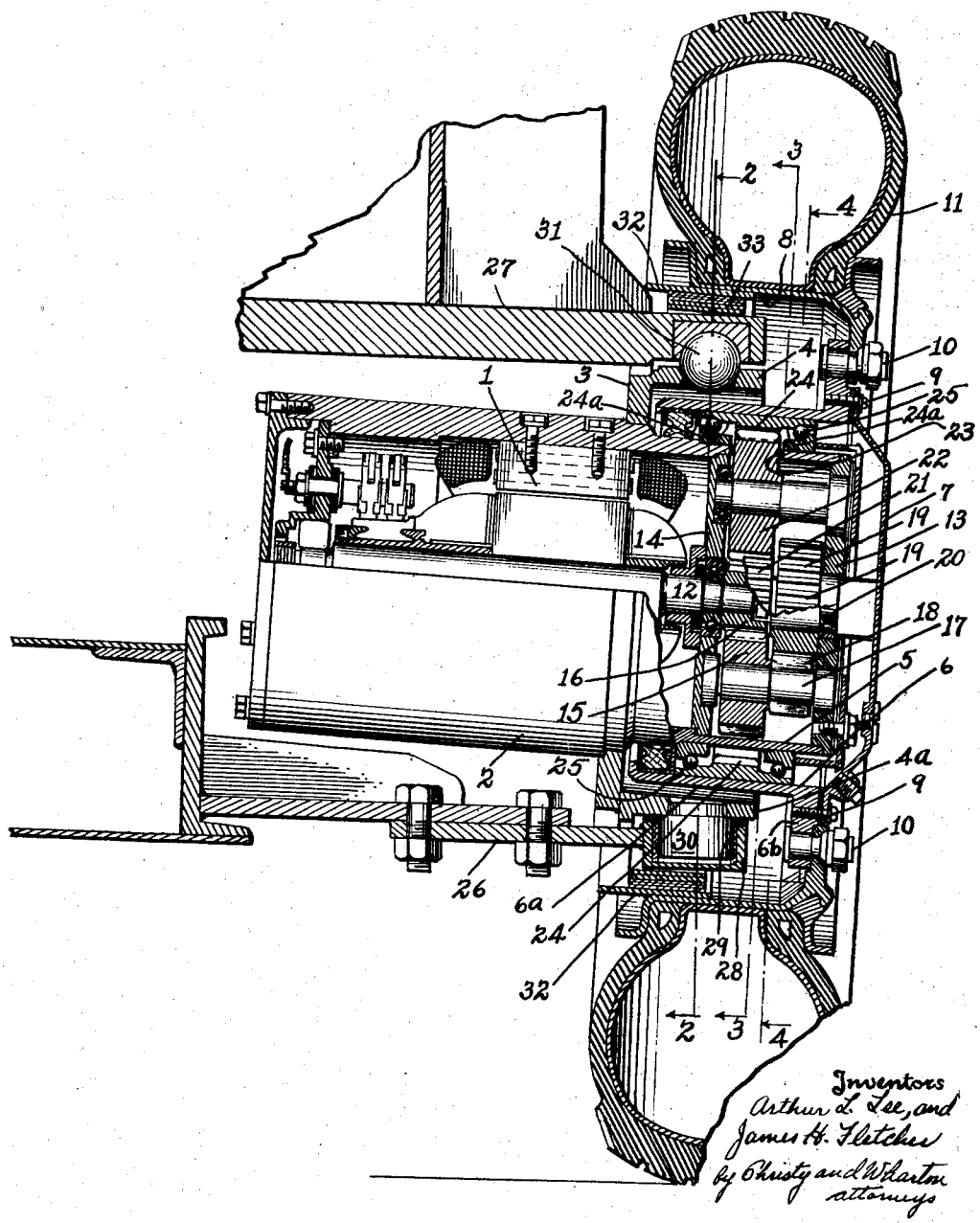
Figure 2:
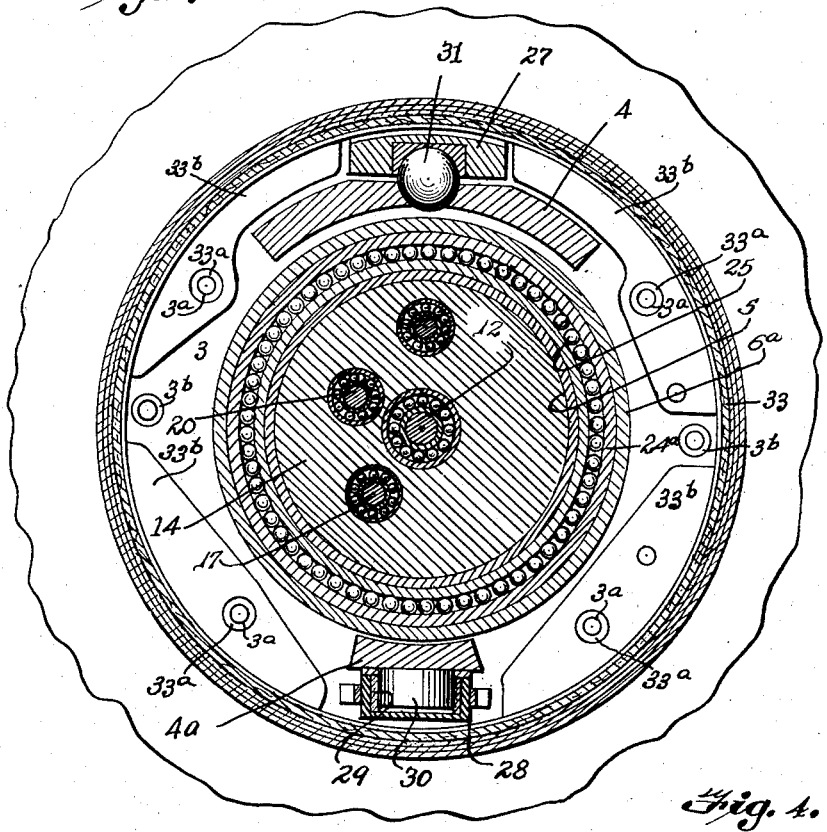
Figure 3:
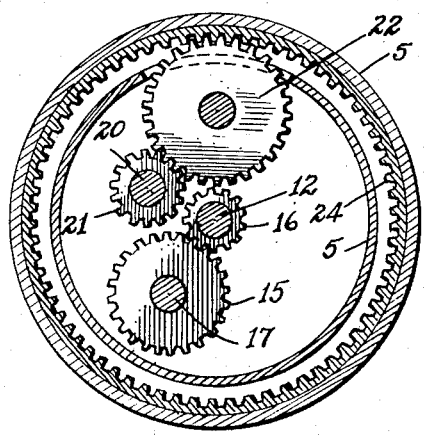
Figure 4:
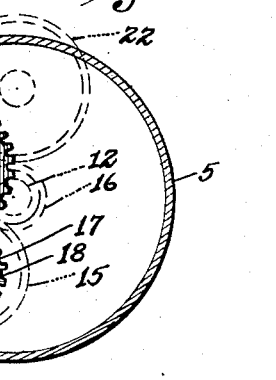
Figure 5:
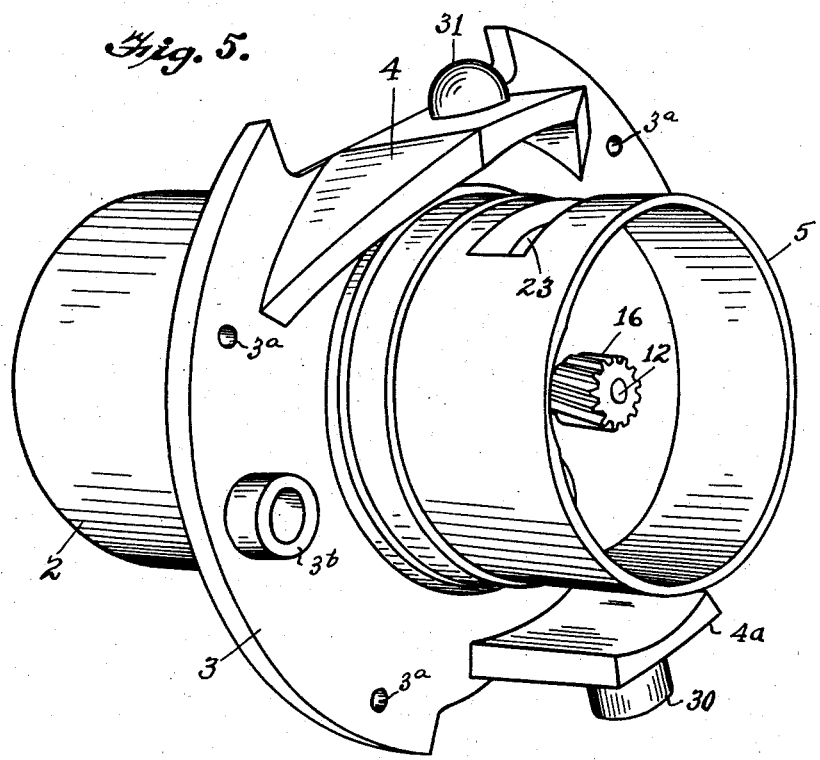
Figure 6:
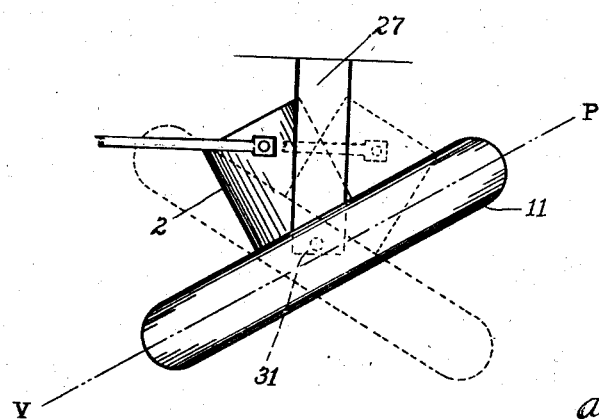

In the accompanying drawings Fig. 1 is a vertical sectional view through our vehicle wheel, taken transversely and centrally of the wheel. Fig. 2 is a vertical sectional view, taken in the plane of the section line 2—2 of Fig. 1, through the steering axis of the wheel. Fig. 3 is a vertical sectional view, taken in the plane of the sectional line 3—3 of Fig. 1, immediately adjacent the driving axis of the wheel. Fig. 4 is a vertical sectional view, taken in the plane of the irregular section line 4—4 of Fig. 1, and collaborative with Fig. 3 in showing the driving connections of the wheel. Fig. 5 is a perspective view of the non-rotative mounting structure of the wheel. Fig. 6 is a schematic view of the wheel; illustrative of the extreme turning action of the wheel, and the manner in which the mounting of the wheel conforms to an extreme turning movement and to load-reception by the wheel close to a vertical plane longitudinally bisecting the wheel tire.

Referring initially to Fig. 1 of the drawings, driving power for the wheel is supplied by an electrical motor 1, enclosed by a cylindrical housing 2. The motor housing extends through the mounting frame 3 of the wheel, which frame is in the form of a circular plate carrying peripheral, forwardly projectant flanges 4 and 4a. The driving mechanism of the wheel is enclosed by a casing element 5, which is cylindrical in its general shape, and which conveniently may be, as shown, a forward extension of motor housing 2. Mounting frame 3 is fixed to the motor housing 2 and, as will be later explained, performs an important function in transmitting the weight of the truck through the wheel to the ground.

The foregoing structure is non-rotative under the driving forces of the wheel, and forms in effect the wheel axle. The rotor structure of the wheel includes a hub 6 in the form of a band which is L-shape in cross section.

In the wheel assembly, the long leg 6a of the L-shape hub element 6 surrounds that forward region 5 of the motor housing 2 which is projectant through mounting frame 3, to form a housing for the driving connections and an axle for the rotor structure of the wheel. The other leg 6b of hub 6 serves as a felly, or base, for mounting the rim and hub-cap of the wheel. To it hub cap 7 and rim 8 are secured by bolts 9 and 10 respectively. In rotation of the wheel, the rotor assembly, consisting of hub 6, hub cap 7, and rim 8 (carrying tire 11) may rotate with respect to motor housing 2 and mounting frame 3.

Referring now also to Figs. 2, 3, and 4 of the drawings, the driving connections for the wheel take the form of a speed-reducing gear train which transmits power from shaft 12 of the electrical driving motor 1. Gears of this speed-reducing gear train are mounted between a front bearing support 13, and a rear bearing support 14 which interlock with the casing element 5. Rear bearing support 14 is in the form of a closure plate, closing off the interior of the motor-containing housing from the interior of the gear-containing housing.

The gears of the speed-reducing train are carried by shafts mounted between the rear bearing support 14 and the front bearing support 13. In this gear train, gear 15 meshes with pinion 16 on the motor shaft 12, and on the shaft 17 which carries gear 15 there is also a pinion 18. Pinion 18 in turn meshes with a gear 19 carried by a shaft 20 which also carries a pinion 21. Pinion 21 meshes with a gear 22 projectant through an opening 23 in housing 5.

Gear 22 is the final element of the gear train. In its projection through the housing, it meshes with an internal ring gear 24 fixed to the inner face of hub 6. It will be seen that this arrangement gives a drive which is well centered with respect to the driven structure of the wheel, as it lies exactly in a plane passing centrally through the tread of tire 11, carried by the wheel rim 8. Ball races 25 are also inserted between the housing 5 and wings 24a of the internal gear 24, in positions close to both sides of the zone in which gear 22 meshes with the internal gear. This balanced drive so transmits driving power in the wheel that wear and likelihood of injury in the driving connections is minimized, and that maximum utilization of the power delivered by the motor is obtained.

In its mounting and steering arrangement, the wheel is mounted between a lower bracket 26 and an upper bracket 27. Lower bracket 26 carries a socket 28, having therein a bushing 29, and arranged to receive a pintle 30 carried by the flange 4a of mounting frame 3. Lying between seats in upper bracket 27 and the flange 4 of mounting frame 3 there is bearing structure, which may as shown take the form of a large bearing ball 31, which provides a turning axis between the upper bracket and the mounting frame 3. These spindle mountings are so arranged that the ball 31 receives the load of the vehicle, transmitting it to mounting frame 3, motor housing 2, and through ball races 25, the hub 6 and tire 11 to the ground.

The braking structure of the wheel is provided by a brake drum 32 carried by the rim 8 of the wheel, and by brake bands 33 having supporting connection with the mounting frame 3 and operated by any conventional assembly of brake elements. For simplicity of illustration the brake bands 33 themselves are omitted from Fig. 5 of the drawings. Mounting holes 3a for brake-band supports and adjusting means for the brake bands are, however, shown in Fig. 5. A tubular boss 3b for the passage and connection of a brake-operating shaft is also therein shown. As indicated in Fig. 2 of the drawings, two of such tubular bosses 3b are provided, to give either a right-hand or left-hand operation of the brake bands, as may be decided upon in installation of the brakes. Fig. 2 also indicates the relative positioning of the brake bands 33 with relation to the mounting elements shown in Fig. 5. Thus, there are holes 33a in webs 33b of the brake-band structure, which holes register with the mounting holes 3a in the frame structure 3. A mounting shaft, carrying adjusting means for the brake bands may thus be projected from the holes 3a of the frame through the holes 33a of the brake-band webs.

It should be noted that in our wheel the ultimate load sustention is thus close to, and symmetrical to both sides of, the zone of power application for driving the wheel. Also the steering spindle formed of a combination of the pintle 30 and ball 31, giving a steering axis very close to the plane in which the wheel is driven, that is, very close to a plane passing through the peripheral center line of the tire tread, permits the imposition of a very short turning radius on vehicles equipped with our wheels. Also the load reception by the wheel at that point avoids the imposition of an "overhung" load on the wheel, thus relieving the wheel of undue tortional stresses.

In this connection reference may be had to Fig. 6 of the drawings. That figure shows the manner in which the wheel structure per se and the motor, carried with and forming part of the wheel, in turning action of the wheel sweep the available space adjacent the body of a vehicle to which the wheel is applied. It is therefore impossible to introduce a spindle-supporting member from the body of a wheel into the space in which the motor housing 2 may move when the wheel is turned in one direction or the other. This difficulty we have overcome by using brackets, such as the brackets 26 and 27 which are aligned vertically and which cooperate with the vertically aligned flanges 4, to give an effective spindle mounting.

This spindle mounting, as is particularly apparent in Fig. 6, gives the wheel turning movement very close to the peripheral center line of the wheel, and applies the load of a vehicle to the wheel in the same locality. It is within a zone defined by the rotor structure of the wheel. That is, it lies between parallel planes tangent to the outer faces of the tires 11, and close to a plane peripherally bisecting the tires.

It may be explained that, in dividing the structure, about which the wheel turns and at which it receives its sustained load, we maintain the two bearing points axially in line with each other, with respect to the remainder of the wheel structure, to give the effect of a through-spindle passing through the wheel structure at that axial line.

It may also be emphasized that the power delivery from the electrical motor to the rotor structure of the wheel is such that a truck or other vehicle equipped with our wheels can start quickly under load, since the driving connections are such as to deliver a high torque for the power rating of the motor. This avoids wasting power and injuring the wheel tires in starting the vehicles under heavy loads on an up-grade. This advantage in power delivery is obtained in an assembly which links with it the advantages of well-centered load reception and sustention, and the advantageous spindle mounting explained above.

When a vehicle, such as a mine truck, is equipped with our wheels the above structural features, and the advantage derived from them, tend to give the vehicle strikingly improved utility. Whereas the wheel of our invention has been discussed as particularly adaptable to use in mine trucks, it should be understood that its utility is not limited to trucks of that specific sort. Its sturdy construction and the short turning radius which it is able to follow in steering the vehicle adapts it to use on any vehicles which are to be operated under heavy loads and at slow speed in localities in which turning space is limited. Also within the restricted space available while retaining the compactness of the wheel assembly, there are included within the structural bounds of the wheel per se spindle mounting, driving connections, and braking elements for the wheel.

It is to be understood that various modifications may be made in the form and arrangement of the elements of the wheel, as shown and described, without departing from the principles of our invention. For example, if so desired, the casing 5 which houses the gear train may be made of one-piece with the mounting frame 3 rather than of one-piece with the motor housing 2. Also, as exemplary of structural changes in our wheel, the bearing ball 31, which receives the load of the vehicle may be a thrust bearing of some different form, and the lower spindle element may take a form other than that of the illustrated pintle 30. These modifications are exemplary only of many detail modifications which fall within the ambit of our invention, as defined by the appended claims.

It further may be explained that certain of the advantages inherent in our self-powered wheel assembly, are effective even though the wheel should be driven by external means, as through a flexible shaft. For example, the power application within the wheel structure, and the spindle mounting, by which extreme turning action and good load distribution are attained, would be of value even though the organization of the wheel would be so changed that it does not comprise its own power source.

We claim as our invention:

1. In a self-powered vehicle-wheel the combination of an electrical motor, a rotor structure having an internal gear therein, a speed-reducing gear train operative between the motor and the rotor structure and comprising an ultimate gear meshing with the internal gear of the rotor structure, mounting structure non-rotatable under the driving forces for the wheel providing housing for the motor and the gear train, load-sustaining elements mounted to transmit the load of a vehicle to which the wheel is applied to said mounting structure, and bearings on said mounting structure placed with respect to the plane of driving defined by the said internal gear to transmit the sustained load to the rotor structure of the wheel in approximate coincidence with the driving forces applied to it.

2. In a self-powered vehicle-wheel the combination of a rotor structure, a mounting structure non-rotatable under the driving forces for the wheel and with respect to which the rotor structure of the wheel rotates, a power source carried by the said mounting structure, gearing carried by the said mounting structure and effective between the said power source and the said rotor structure to deliver driving power to the latter, bearings between the said mounting structure and the said rotor structure placed to transmit the load carried by the wheel to the said rotor structure in approximate coincidence with a plane in which the driving forces are applied to the rotor structure, and a spindle structure arranged to act upon the said mounting structure in steering to turn the wheel assembly about a steering axis close to a plane peripherally bisecting the rotor structure of the wheel.

3. A wheel assembly in accordance with the definition of claim 2 in which the gearing arranged to deliver driving power from the power source to the rotor structure of the gear assembly is a speed-reducing gear train.

4. In a vehicle-wheel the combination of a rotor structure comprising a ground-contacting element, a mounting structure non-rotatable under the driving forces for the wheel and with respect to which the rotor structure of the wheel rotates, an internal gear carried by the said rotor structure, driving connections carried by the mounting structure including a final gear meshing with the internal gear carried by the rotor structure of the wheel, a power-delivery shaft, and gearing interconnecting the said power shaft and the said final gear for delivering power to the said rotor structure, bearings between the said mounting structure and the said rotor structure arranged symmetrically to transmit the load carried by the wheel to the ground-contacting element of the driving structure, and a spindle structure arranged to act upon the said mounting structure in steering to turn the wheel assembly about a steering axis and close to a plane peripherally bisecting the ground-contacting element of the rotor structure.

5. A wheel assembly in accordance with the definition of claim 4 in which the gearing arranged to deliver power from the said power-delivery shaft to the said rotor structure including the said final gear and the said internal gear forms a speed-reducing gear train.

6. In a mounting structure for a self-powered vehicle-wheel, which wheel comprises a mounting frame non-rotatable under the driving forces for the wheel, a rotor structure rotatable with respect to the said mounting frame, and a motor housing integrated with the said mounting structure and projectant laterally beyond a zone defined by the rotor structure of the wheel; the combination of two brackets projectant into the said zone defined by the rotor structure of the wheel and spaced diametrically thereof to receive the said mounting frame and the motor housing between them, and two spindle elements at least one of which is adapted to receive and transmit a load sustained by the wheel placed each between the said mounting frame and one of the said brackets within the said zone defined by the rotor structure of the wheel, cooperatively to provide within that zone a steering axis for the wheel.

7. A driving wheel composite of a rotor structure, a mounting structure non-rotatable under driving forces for the wheel and with respect to which the rotor structure of the wheel rotates, driving connections carried by the said mounting structure within the encircling bounds of the said rotor structure, and both spindle mounting for the wheel assembly and braking means effective on the wheel rotor organized between the said mounting structure and the said rotor structure and substantially within the lateral bounds of the rotor structure.

8. A driving wheel composite of a rotor structure, a mounting structure non-rotatable under driving forces for the wheel and with respect to which the rotor structure of the wheel rotates, driving connections carried by the said mounting structure within the encircling bounds of the said rotor structure, and spindle mounting for the assembly organized between the said mounting structure and the said rotor structure and substantially within the lateral bounds of the rotor structure.

9. A driving wheel composite of a rotor structure, a mounting structure non-rotatable under driving forces for the wheel and with respect to which the rotor structure of the wheel rotates, driving connections carried by the said mounting structure within the encircling bounds of the said rotor structure, braking means effective on the rotor structure organized between the mounting structure and the rotor and substantially within the lateral bounds of the rotor structure, and a divided spindle mounting effective between the mounting structure of the wheel and the rotor structure thereof.

10. In a vehicle wheel mounting and driving assembly the combination of a mounting frame non-rotatable under the driving forces for the wheel and peripherally organized rotatably to carry a rotor structure, power-transmitting gearing within the said mounting frame for driving a rotor structure peripherally carried thereon, and two spindle elements spaced from each other on the said mounting frame to provide a steering axis for the wheel and load transmission thereto.

11. In a vehicle wheel mounting and driving assembly the combination of a mounting frame non-rotatable under the driving forces for the wheel and peripherally organized to carry a rotor structure, power-transmitting gearing within the said mounting frame for driving a rotor structure peripherally carried thereon, two spindle elements spaced from each other on the said mounting frame to provide a steering axis for the wheel and load transmission thereto, and brake elements carried by the said mounting frame.

12. In a vehicle wheel mounting and driving assembly the combination of a mounting frame non-rotatable under the driving forces for the wheel and peripherally organized rotatably to carry a rotor structure, a primary drive shaft extended into the said mounting frame, a speed-reducing gear train having the elements thereof mounted with their axes disposed eccentrically with respect to the axis of the said primary drive shaft, and two spindle elements spaced from each other on the said mounting frame to provide a steering axis for the wheel and load transmission thereto.

13. In a vehicle wheel mounting and driving assembly the combination of a concentric arrangement of mounting frame non-rotatable under the driving forces for the wheel and peripherally formed rotatably to carry a rotor structure and a rotor structure rotatably carried on the outer periphery of said mounting frame, with a primary drive shaft extended into the said mounting frame, a plurality of reduction gears organized between the said primary drive shaft and the said rotor structure and within the confines of the rotor structure providing a plurality of stages of speed reduction in the delivery of driving power from the said primary drive shaft to the said rotor structure, and two spindle elements spaced from each other on the said mounting frame to provide a steering axis for the wheel and load transmission thereto.

ARTHUR L. LEE.
JAMES H. FLETCHER.